Figure 10:
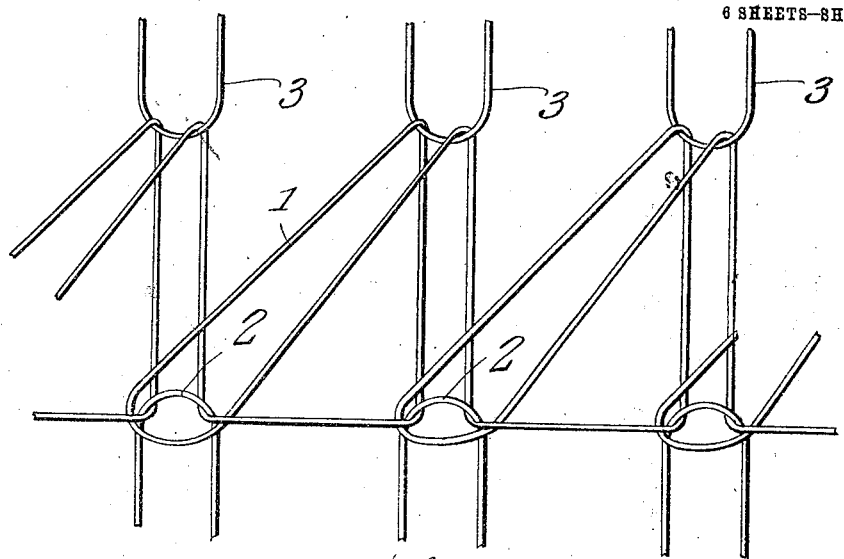

E. O. DAVIS.
MACHINE FOR SEWING LOOPED FABRIC.
APPLICATION FILED MAY 19, 1909.
1,054,658.
Patented Feb. 25, 1913.
6 SHEETS—SHEET 1.
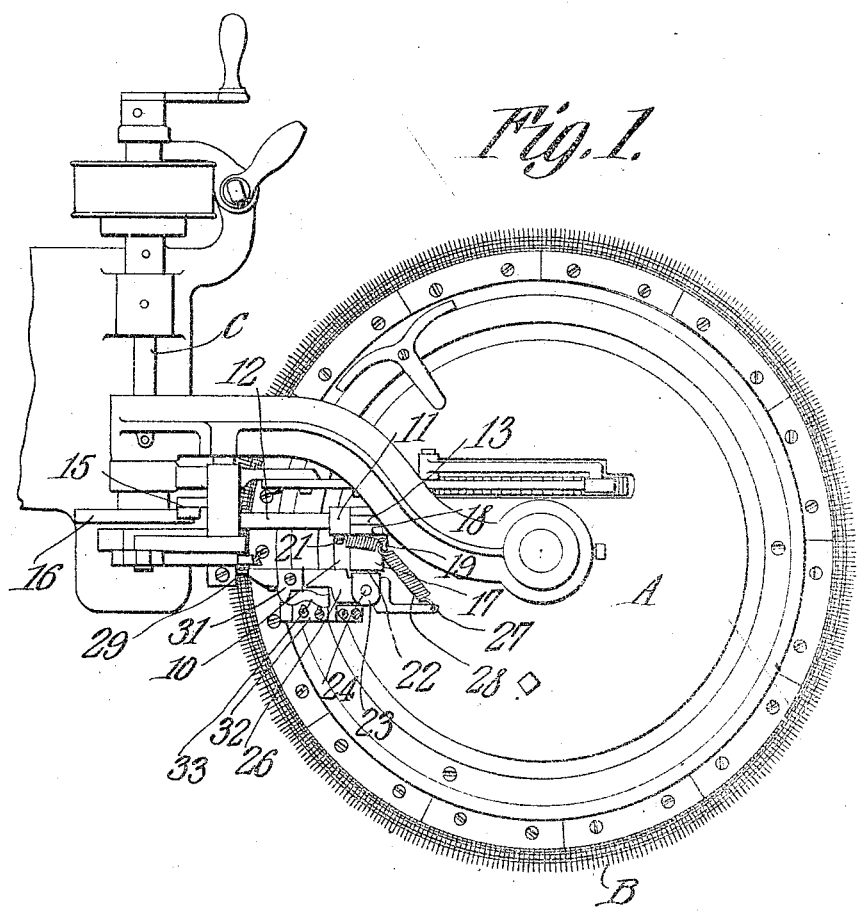
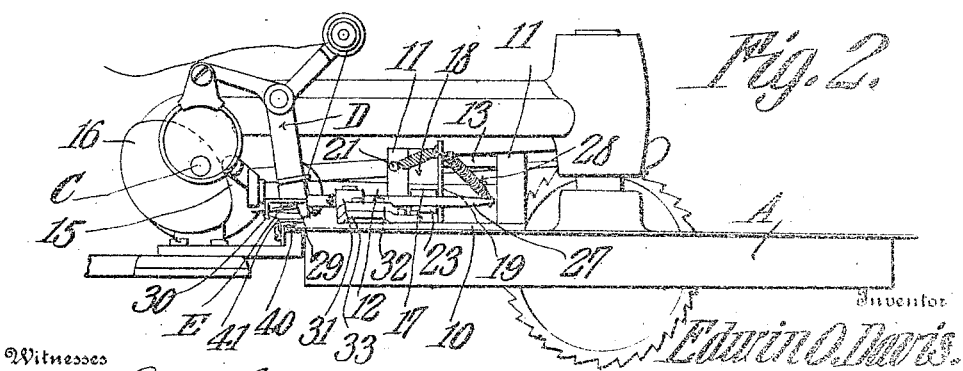

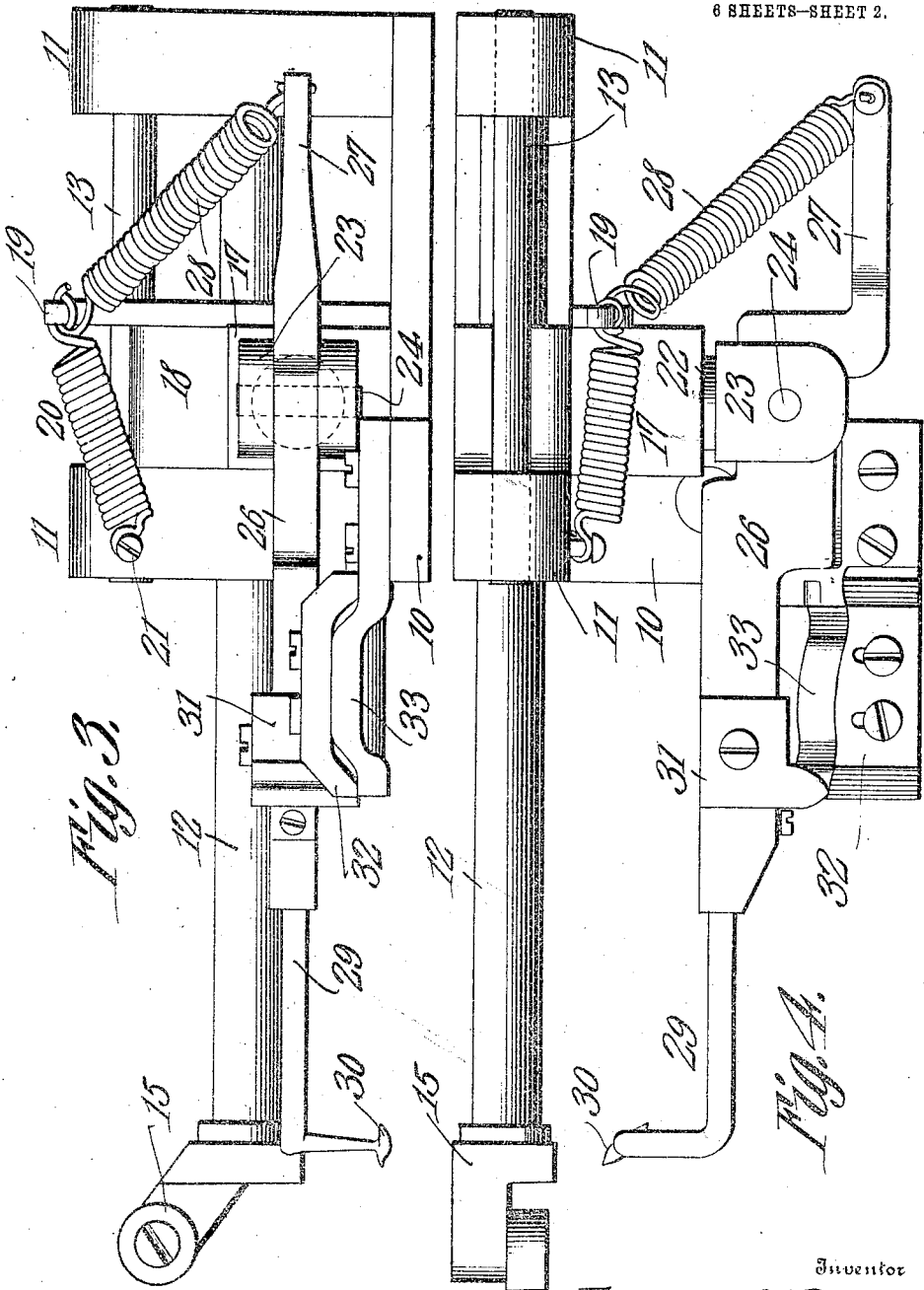

E. O. DAVIS.
MACHINE FOR SEWING LOOPED FABRIC.
APPLICATION FILED MAY 19, 1909.
1,054,658.
Patented Feb. 25, 1913.
6 SHEETS—SHEET 3.
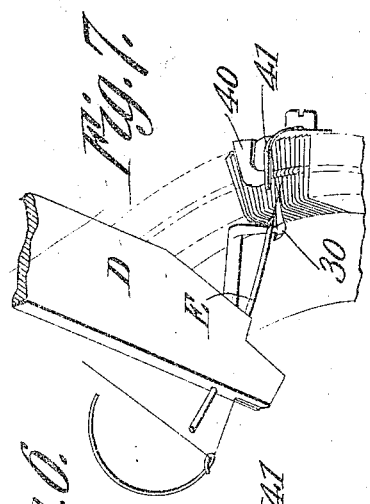
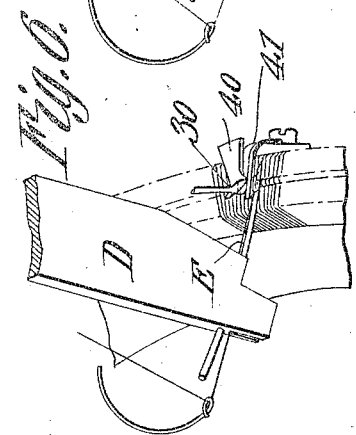
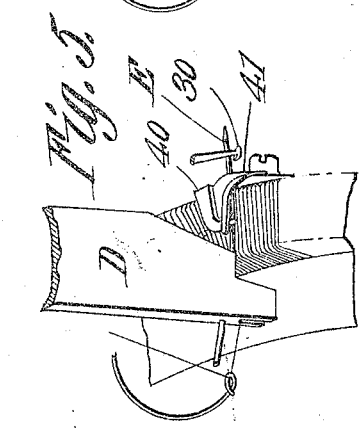
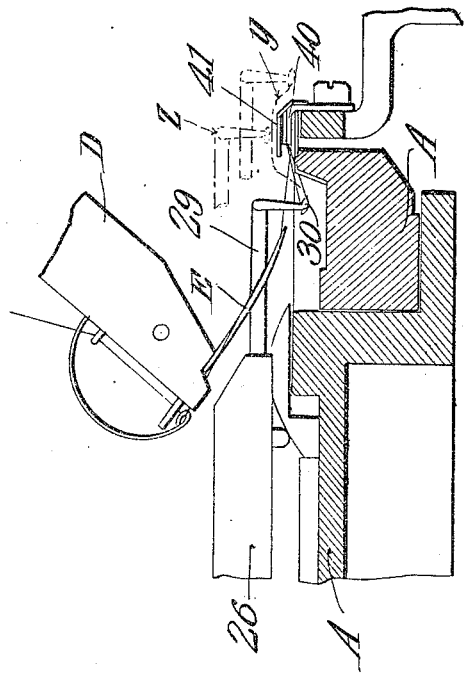
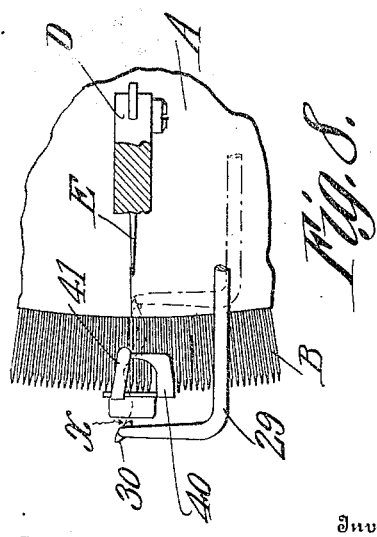
Witnesses
Inventor
Edwin O. Davis.
By C. A. Snow & Co.
Attorneys

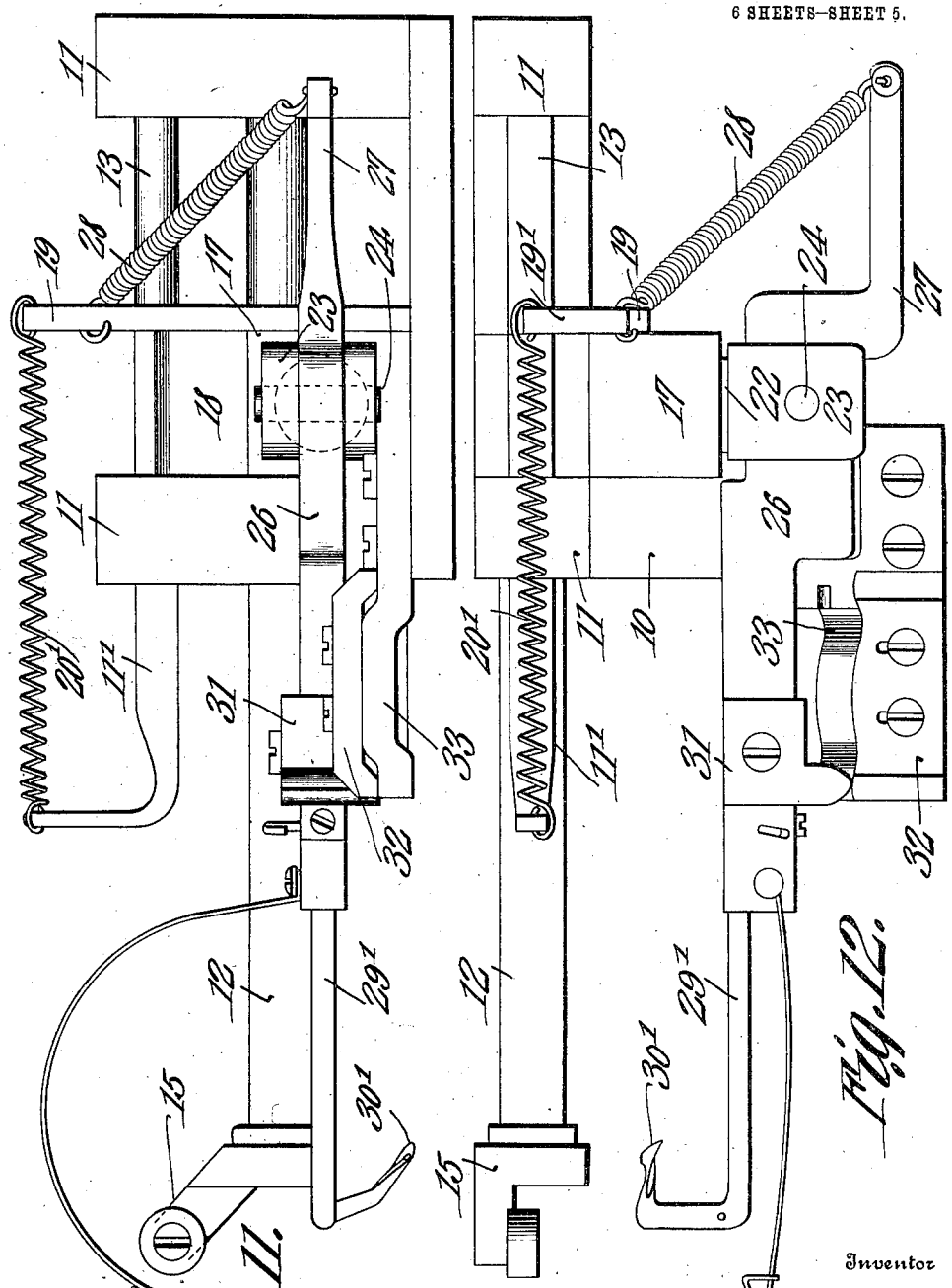

E. O. DAVIS.
MACHINE FOR SEWING LOOPED FABRIC.
APPLICATION FILED MAY 19, 1909.
1,054,658.
Patented Feb. 25, 1913.
6 SHEETS—SHEET 6.
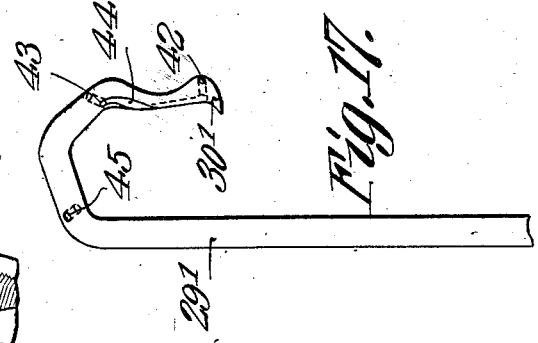
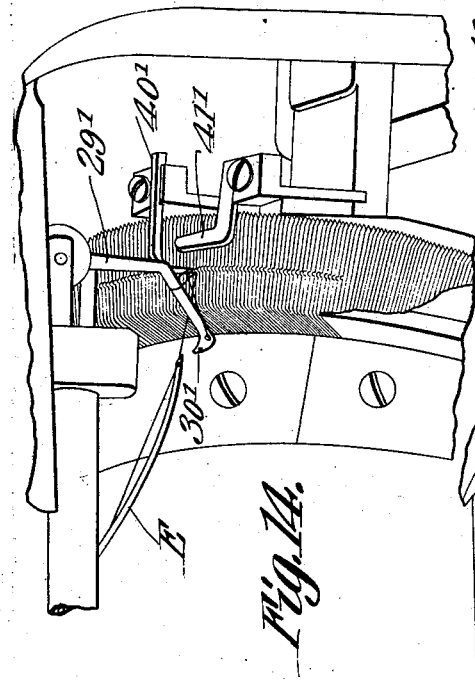
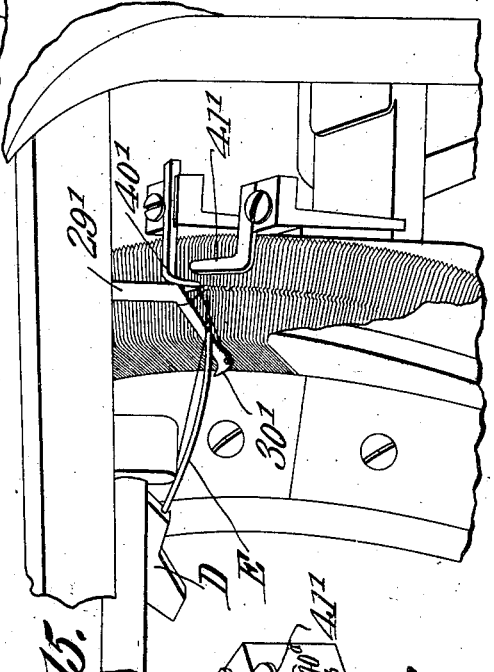
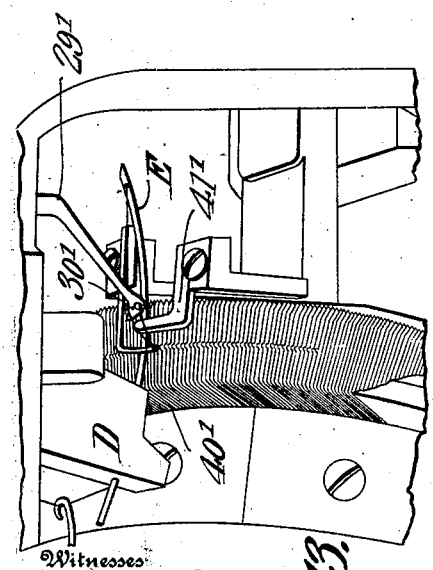
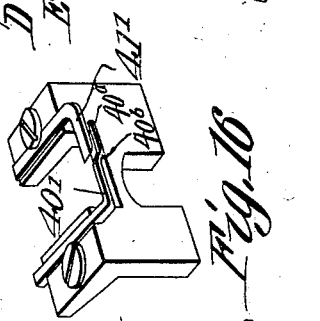
Witnesses:
Inventor
Edwin O. Davis.
By C. A. Snow & Co.
Attorneys

UNITED STATES PATENT OFFICE.

EDWIN O. DAVIS, OF PADUCAH, KENTUCKY.

MACHINE FOR SEWING LOOPED FABRIC.

1,054,658.  Specification of Letters Patent.  Patented Feb. 25, 1913.

Application filed May 19, 1909. Serial No. 496,995.

*To all whom it may concern:*

Be it known that I, EDWIN O. DAVIS, a citizen of the United States, residing at Paducah, in the county of McCracken and State of Kentucky, have invented a new and useful Machine for Sewing Looped Fabric, of which the following is a specification.

This invention relates to looper machines of that type employed for uniting knit fabrics wherein the needle is passed outward from the base or shank of the points on which the fabric is supported.

The machine to which the present invention is applied is fully shown and described in United States Letters Patent, No. 273,143 issued to William Pearson on February 27, 1883.

The principal object of the present invention is to provide a novel form of looper and looper actuating means of such construction as to insure the catching of the needle thread, the formation of the loop and the presentation of such loop in position for the passage of the needle at the next operation.

A further object of the invention is to provide a novel form of looper and looper actuating mechanism which may be made in the nature of an attachment and applied to existing machines.

A still further object of the invention is to prevent the formation of tight stitches such as would render the fabric inelastic.

A still further object of the invention is to provide a fixed member which is arranged in the path of the looper and is designed by engagement with the looper thread to draw the previous stitch taut, said member being arranged to be included in the stitch so that when the fabric is withdrawn the stitch will be sufficiently slack to afford the necessary elasticity.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

Figure 18:
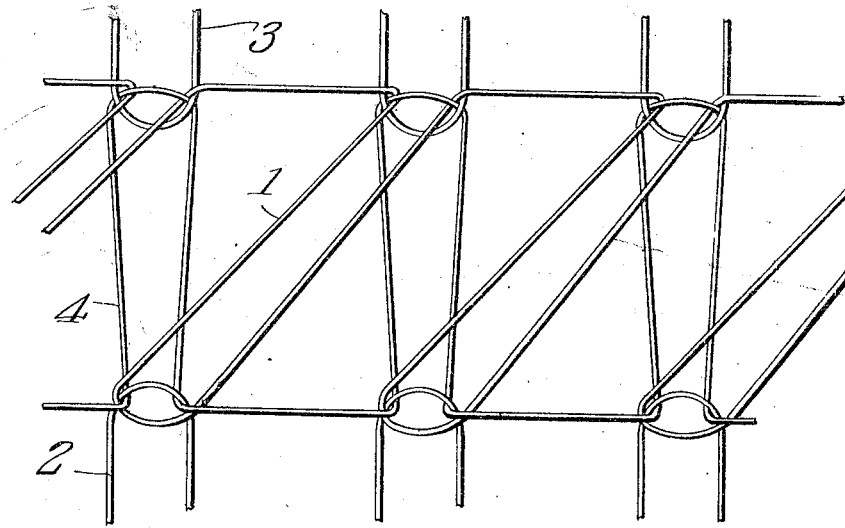

In the accompanying drawings:—Figure 1 is a plan view of a looper machine provided with a looper and looper actuating mechanism constructed in accordance with the invention. Fig. 2 is a side elevation of the machine. Fig. 3 is a side elevation of the looper attachment drawn to an enlarged scale. Fig. 4 is a plan view of the same. Figs. 5, 6 and 7 are diagrams in perspective, illustrating the operation of the machine. Fig. 8 is a plan view of the diagrammatical course followed by the looper in a horizontal plane. Fig. 9 is a transverse sectional view through a portion of the machine, showing the diagrammatical course followed by the looper in a vertical plane. Fig. 10 shows the stitch. Fig. 11 is a view similar to Fig. 3 but illustrating some modifications in the structure. Fig. 12 is a view similar to Fig. 4, being a plan view of the structure shown in Fig. 11. Figs. 13, 14 and 15 are perspective views of portions of the machine showing different phases of operation with a thread carrying looper. Fig. 16 is a perspective view of the point carrying frame and point thereon. Fig. 17 is a perspective view of a looper adapted to carry a thread. Fig. 18 shows the stitch made by the addition of the thread carrying looper.

Similar numerals of reference are employed to indicate corresponding parts throughout the several figures of the drawings.

The machine illustrated in the accompanying drawings is of that general type shown in the Letters Patent hereinbefore referred to and includes in its construction a suitable support A, carrying a brass with points B on which the looped fabrics to be united are supported.

At one side of the machine is arranged a power shaft C from which all of the operating parts receive motion, and in advance of the power shaft is supported a needle bar D carrying a curved needle E which traverses the small grooves formed in the upper faces of the points from the brass or shank of each point and passes through the two loops of the sections of fabric which are to be united, the needle thread being carried through these loops and being then engaged by the looper which forms the subject of the present invention.

Secured to the central stationary plate of the machine is the base plate 10 of the attachment. This base plate is provided with a pair of vertically disposed standards 11 having bearings for the reception of a slidable bar 12, while the upper ends of the standards are connected by a small cross bar 13. One end of the bar 12 is arranged to extend over and beyond the circular row of points and carries an enlarged head 15 that is engaged by a cam 16 which is placed on the shaft C, this cam being substituted for the cam which is ordinarily employed for the operation of the looper in the commercial machine.

Secured rigidly to the bar 12 is a block 17 having an upwardly extending arm 18 the upper surface of which is provided with a groove for the reception of the bar 13 so that the block and bar 12 will be held from rotative movement, and can only move in the direction of the length of said bar 12. The block further carries an arm 19 that is connected by a tension spring to a stud 21 on one of the standards, this spring serving to maintain the head of the bar in constant engagement with the periphery of the actuating cam.

The front face of the bar 18 has a circular recess in which is pivotally mounted a pin 22 carrying a bracket 23 through which extends a pivot pin 24, the axis of the latter being in a plane at a right angle to the axis of the pin 22. Pivoted on the pin 24 is a looper carrying lever 26 having a rearwardly extending arm 27 that is connected by a spring 28 to the arm 19. At the front end of the lever is secured a looper bar 29 which carries the looper 30. Mounted on the lever 26 is a block 31 the outer and lower faces of which are arranged to be acted upon by cams 32 and 33 respectively, and these cams serve to move the looper in the necessary course as the bar 12 is reciprocated by the looper cam 16. It will be seen that the tension spring 28 is so arranged as to hold the bottom of the block 31 down against the cam 33 and the outer face of the block against the vertical surface of the cam 32 and the lever 26 is free to swing on the pin 24 in a horizontal plane, and on pin 22 in a vertical plane so that it is practically mounted for universal movement.

Secured to the outer portion of the external frame is a throat plate 40 that projects over the line of the points and has a tapered tongue pointing in the direction in which the machine rotates and extending over that portion of the points on which the stitches are formed the function of this tongue being to assist in holding the loop for the passage of the needle and to retain the loop until during the operation of the machine the loop is withdrawn from its end or point.

At the side of the tongue is a guard finger 41 which extends over the point of the tongue and serves to prevent accidental disengagement of the loop during the time the loop is being drawn away from the brass and presented in a position for the passage of the needle.

In operation the needle passes through the two loops of the fabric to be united and carries its thread to a point some distance beyond the brass approximately to the position shown in Fig. 5; as the needle starts to retreat the slack of the thread is caught by the looper and the latter then follows the course dictated by the two cams 32 and 33. The movement in a horizontal plane is indicated by the dotted line $x$ in Fig. 8 and the movement in a vertical plane is indicated by the dotted line $y$ in Fig. 9. This compound movement is necessary for the purpose of clearing the needle and carrying the loop first upward and then inward over the points and over the tongue 40, the main position being shown in the diagram Fig. 6 and by the dotted positions $z$ in Fig. 9. As the looper continues its inward movement it travels in a horizontal plane in a direction toward the rod of the tongue 40 and thence downward and inward and forward, or in the direction of rotation of the machine until it reaches the positions shown in Figs. 7 and 9, at which time the loop or thread will be bent over the tongue and held in position for the passage of the needle which by this time has completed its backward movement and is again starting the forward thrust to pass through the next two loops of the fabric on the next succeeding point of the machine. So that the needle thread is carried first through the loop thread 1 (see Fig. 10) then through the two loops 2 and 3 of the knitted fabric to be united. As the loop is carried inward over the tongue the thread is drawn taut at the preceding loop but as the tongue is still included in this preceding loop the thread cannot be drawn so tight as to render the fabric inelastic in this point and, as a matter of fact, the needle thread occupied by the tongue will be sufficient to make the garment as elastic at the seam as at any other point. Generally considered the structure shown in Figs. 11 and 12 agrees with that of Figs. 3 and 4 but differs therefrom in some details. The spring 20 is replaced by a spring 20' connected at one end to an angle extension 19' of the arm 19 and connected at the other end to a bracket 11' continued from the bar 13. Instead of the looper bar 29 there is provided a looper bar 29' carrying a looper 30'. The looper bar differs but slightly from that shown in Figs. 3 and 4 in that the portion carrying the looper head is returned a short distance along the bar 29 but spaced therefrom. Furthermore, the looper head has a transverse thread receiving eye 42 as indicated in Fig. 17 and at a distance therefrom another eye 43, the two eyes being joined by a groove 44 for the reception of the thread along one side of the stem carrying the head 30'. The bent portion of the bar 29' where it joins the shank of the bar is also provided with an eye 45 through which the thread is first passed to be then carried through the eye 43 then along the groove 44 and finally through the eye 42 from whence the thread passes to the fabric being operated on. The guard finger 41 or 41' extends over the point of the tongue of throat plate 40 or 40', and is adapted to prevent any accidental slipping or disengagement of the loop on the latter during the time it is drawn and held in position for the passage of the needle.

The throat plate 40 and guard finger 41 may be replaced by a throat plate 40' and guard finger 41' as indicated in Fig. 16.

The stitch formed by the structures of Figs. 11 and 12 and the thread carrying looper differs from that of Fig. 10 in that the extra thread carried by the looper forms a lock chain stitch which greatly strengthens the junction and prevents ripping. The stitch is shown in Fig. 18 where the extra thread carried by the looper is indicated at 4.

The throat plates 40, and 40', terminate in tapered stitch carrying fingers extending in a horizontal plane parallel with and in close proximity to a plurality of the subjacent impaling pins and are adapted to ride upon the adjacent loops of fabric to be united thereon.

The thread needle and looper are adapted to pass beneath and over the stitch carrying tongue portion 40ª, respectively, forming a chain of stitches about said stitch carrying tongue portion and through the subjacent loops of fabric on the impaling pins as illustrated most clearly in Figs. 6, 7, 13, 14, and 15 of the drawings, and it will be observed that in Figs. 13, 14, and 15, the looper is of the thread carrying type, and that the tongue portion 40ª is arranged above and below the paths of travel of said thread needle and looper.

In the form shown in Figs. 13, 14, 15, and 16, the stitch carrying tongue 40ª is provided with an offset or shoulder portion 40ᵇ, and the thread needle is adapted to pass beneath the shank portion of the stitch carrying tongue at the rear of the shoulder portion 40ᵇ, and about which the loops are initially formed by the movements of the thread needle and looper. As the loops are being formed on the slightly elevated shoulder portion 40ᵇ, each loop as drawn taut by the formation of the next succeeding loops is drawn or carried down to and follows upon the depressed stitch carrying tongue 40ª, (see Fig. 6) thus forming a chain of stitches of uniform thickness and formation throughout. As the depressed portion 40ª included in said chain of stitches rests on the adjacent loops of fabric united by said stitches and extends in the direction of travel as carried by the subjacent impaling pins, said chain of stitches are carried along said depressed portion 40ª, and with the adjacent loops of fabric included in said chain of stitches whereby the latter are carried off of the free end of said stitch carrying tongue in the form of an elastic chain of stitches uniting the adjacent edges of the fabric by what may be termed a "two-thread overlocking seam". The depressed tapered tongue portion 40ª, rests immediately above the path of travel of the loops of fabric carried by the subjacent impaling pins and extends substantially in the same horizontal plane with that intersected by the reciprocation of the curved thread needle at the rear of the shoulder or offset portion 40ᵇ.

What is claimed is:—

1. In a machine for uniting knit fabrics, a ring of impaling pins, a reciprocating thread needle and looper, and a throat plate provided with an offset stitch carrying tongue of reduced diameter extending in a horizontal plane above a plurality of said impaling pins and carried above a plurality of the loops of fabric united on said impaling pins by said reciprocating thread needle and looper, and a guard finger extending over the point of said stitch carrying tongue.

2. In a sewing machine, the combination with a series of impaling pins and a reciprocating thread needle and thread carrying looper; of a stitch carrying tongue having a portion arranged above and below the path of travel of said reciprocating thread needle and looper, respectively, said tongue extending from the zone of the formation of said stitches and being included in a chain of elastic stitches uniting the subjacent loops of fabric on said impaling pins, and a guard finger extending over the point of said stitch carrying tongue.

3. In a machine of the class described, the combination with the points and sewing needle, of a looper, and a slack-forming means comprising a throat plate with a tapered tongue extending over the points, and a guard finger overlying the point of the tongue.

4. In a machine of the class described, the combination with the points, and needle, of a looper, a looper carrying lever mounted for universal movement, a carrier for the lever, means for reciprocating the carrier and stationary cams for directing the course of the lever and looper.

5. In a machine of the class described, the combination with the points, and needle, of a looper, a looper carrying lever, a bracket on which the lever is pivoted, a reciprocatory block to which the bracket is pivoted, the two pivots being disposed at an angle to each other, means for reciprocating the block, and stationary cams for directing the course of travel of the lever and looper.

6. In a machine of the class described, the combination with the points, and needle, of a looper, a lever carrying the looper, a reciprocatory block on which the lever is mounted for universal movement, means for actuating the block, a wear block carried by the lever, and stationary cams arranged to engage said block and direct the course of the looper.

7. A looper machine attachment comprising a base, standards on the base, a reciprocatory bar mounted in said standards, a guiding rod on the standards, a block secured to the bar and slotted for the reception of the rod, a spring tending to hold said block in one direction, a bracket pivoted to the block, a lever pivoted to the bracket, the two pivots being at a right angle to each other, a pair of stationary cams, a wear block mounted on the lever and means tending to hold the wear block across said stationary cams.

In testimony that I claim the foregoing as my own, I have hereto affixed my signature in the presence of two witnesses.

EDWIN O. DAVIS.

Witnesses:
JAMES S. CLIFFORD,
EVALYN M. BOWEN.